T. J. ROGERS.
FLY TRAP.
APPLICATION FILED JAN. 25, 1909.

984,392.

Patented Feb. 14, 1911.
2 SHEETS—SHEET 1.

Witnesses

Inventor
Thomas J. Rogers
By
Attorneys

T. J. ROGERS.
FLY TRAP.
APPLICATION FILED JAN. 25, 1909.
984,392.
Patented Feb. 14, 1911.
2 SHEETS—SHEET 2.
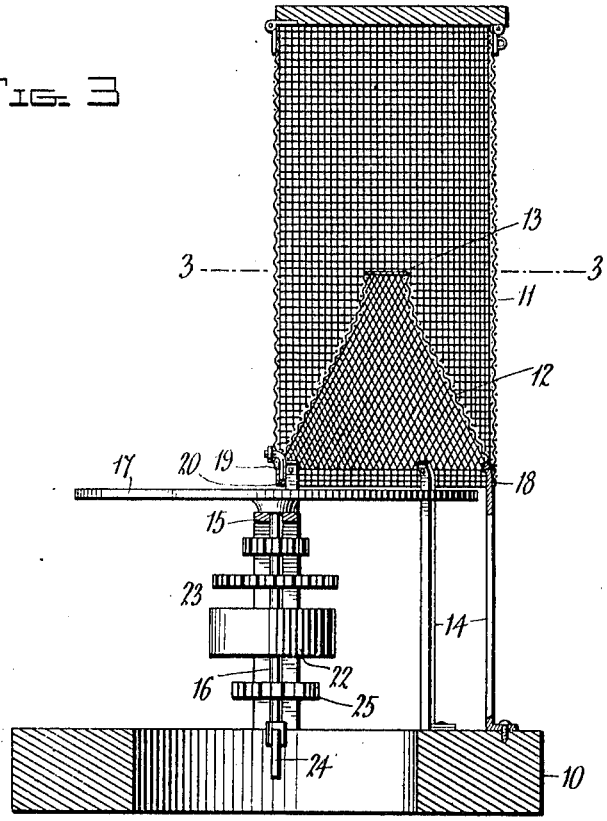
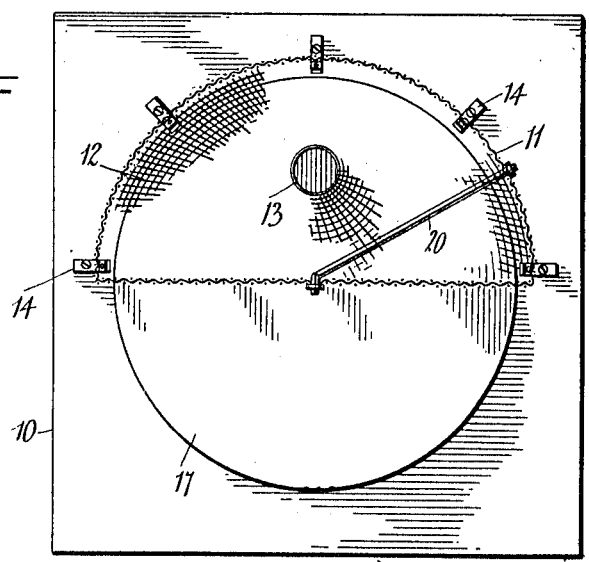
Witnesses
Inventor
Thomas J. Rogers
By
Attorneys

UNITED STATES PATENT OFFICE.

THOMAS JOHN ROGERS, OF HENLEY, CALIFORNIA, ASSIGNOR OF ONE-HALF TO U. L. HAKES, OF HENLEY, CALIFORNIA.

FLY-TRAP.

984,392.  Specification of Letters Patent.  Patented Feb. 14, 1911.

Application filed January 25, 1909. Serial No. 474,107.

*To all whom it may concern:*

Be it known that I, THOMAS JOHN ROGERS, a citizen of the United States, residing at Henley, in the county of Siskiyou, State of California, have invented certain new and useful Improvements in Fly-Traps; and I do hereby declare the following to be a full, clear, and exact description of the invention, such as will enable others skilled in the art to which it appertains to make and use the same.

This invention is an improved fly trap and consists in the construction, combination and arrangement of device hereinafter described and claimed.

Figure 1:
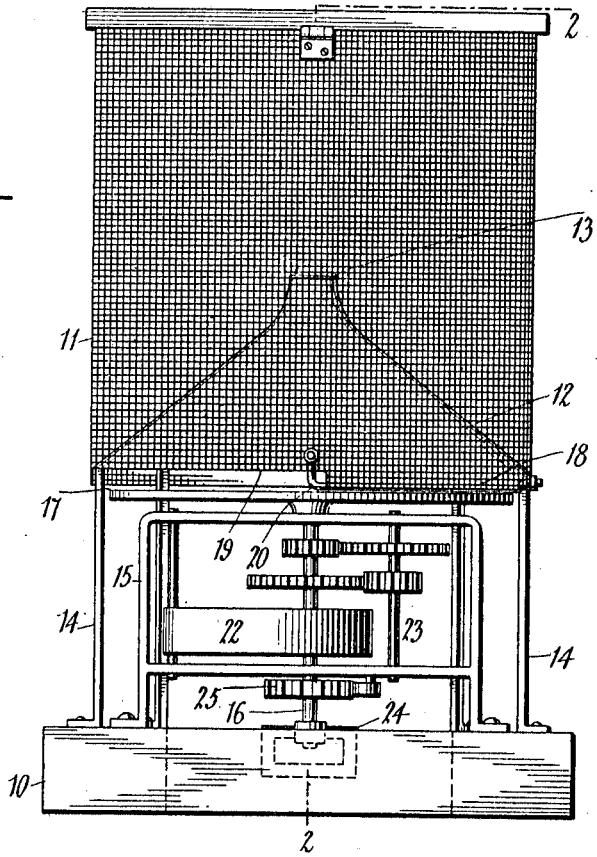
Figure 2:
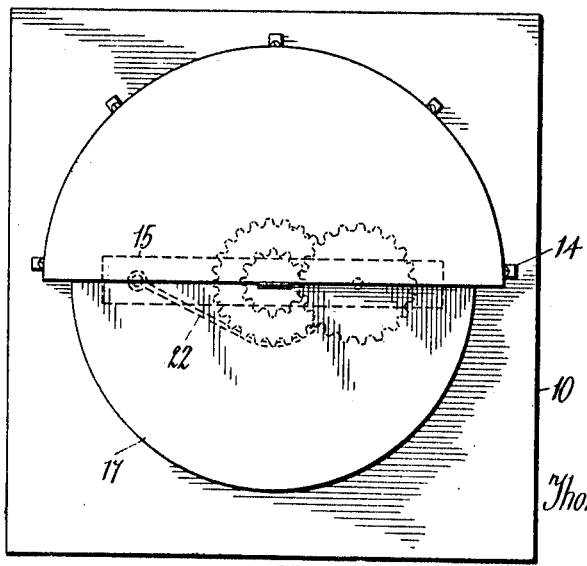

In the accompanying drawings Figure 1 is a front elevation of the improved device. Fig. 2 is a plan view of the improved device. Fig. 3 is a section on the line 2—2 of Fig. 1. Fig. 4 is a section on the line 3—3 of Fig. 3.

The improved device comprises a base 10, preferably of wood. Located some distance above one portion of the base 10 is a semi-cylindrical case 11 preferably formed with its walls of fly screen material and with a conical bottom 12, the latter having an aperture 13 at its apex and providing communication with the interior of the cage. The cage is supported at a considerable distance above the base 10 by standards 14, any required number being employed. Supported upon the base 10 is a frame 15 having a vertical shaft 16 mounted for rotation therein. Connected to the upper end of the shaft 16 is a disk 17, the upper face of the disk operating in relatively close proximity to the lower edge of the cage. The shaft 16 is located preferably near or opposite to the inner wall of the cage, so that one portion of the disk 17 operates constantly beneath the cage and the other portion operates constantly in advance of the cage, as shown in Fig. 3. At one side of the shaft 16 the lower edge of the cage extends close to the disk 17, as shown at 18, so that flies or other insects cannot pass between the disk and the cage at that side, while the lower edge of the cage at the opposite side of the shaft is spaced sufficiently far from the disk as at 19, to permit the flies or other insects to pass, or be carried beneath the cage by the revolving disk. Attached to the cage 11 is a stripper element, preferably in the form of a wire 20 having a horizontal portion close to the disk, and operating to cause the insects to fly upwardly from the disk, and when thus disturbed the insects will pass upwardly through the aperture 13 into the interior of the cage, and thus be "trapped". One end of the said stripper wire is attached to the lower edge of the flat wall of the case, at the center thereof and the other end of the stripper wire is attached to the semi-cylindrical wall of the case near the lower edge thereof, the said stripper wire being disposed at an angle with reference to the flat wall of the case and being also disposed under the conical bottom 12. The said stripper wire also serves as a brace to strengthen the construction of the case and the conical bottom thereof as will be understood.

A suitable motor is connected to the shaft 16 to operate the disk 17 and this motor will preferably be a clock-work device represented as a whole at 23 and operative by a spring 22 of usual construction, the spring having a winding ratchet 25 and a key 24, to enable the spring to be wound up when required. The standards 14 being connected to the base 10 by screws are easily detachable, and the same is true of the frame 15. By this simple arrangement it will be noted that the cage may be readily detached from the base 10 to render the motor and disk readily accessible when required, or the frame 15 with the motor and disk attached may be readily removed if required without disturbing the cage. Thus in the event of the impairment or breaking of any of the parts, they may be readily renewed without discarding the remaining unimpaired portions.

The improved device may be constructed of any suitable material, or of any required size or capacity, but all of the parts except the base 10 will preferably be of metal, while the base will preferably be of wood.

The disk 17 will preferably be about ten or twelve inches in diameter and the remaining parts in proportion, but it will be understood that it is not desired to limit the invention to any specific size. Suitable bait, preferably sugar or the like will be arranged upon the disk, to tempt the flies or other insects. The speed of the disk will be relatively slow so that the insects will not be deterred from alighting thereon or cause them to fly away from the disk after they have once alighted, but to remain upon the slowly revolving disk and be carried thereby beneath the conical bottom of the cage and thus "trapped" therein as before described.

What is claimed, is:

The herein described fly trap comprising a base, a frame thereon, a motor carried by said frame and including a vertical shaft and a disk at the upper end of said shaft, a foraminous semi-cylindrical case disposed slightly above one side of said disk, a wire having one end fixed adjacent the lower edge of the flat side of said case and centrally thereof, said wire having its other end fixed to the curved side of said case adjacent the lower end thereof and at a point spaced from the flat side of the case, whereby said wire constitutes a combined stripper to remove insects from the disk and a brace to hold the central lower portion of the flat side of the case from bending, and means to support said case and wire in position.

In testimony whereof, I affix my signature, in presence of two witnesses.

THOMAS JOHN ROGERS.

Witnesses:
CHRISTOPHER C. MALTBY,
CALVIN PEAS HUGHES.